(12) United States Patent
Bragheri et al.

(10) Patent No.: US 7,813,034 B2
(45) Date of Patent: Oct. 12, 2010

(54) MULTI-STAGE RAMAN AMPLIFIER

(75) Inventors: Attilio Bragheri, Vigevano (IT); Giulia Pietra, Pavia (IT); Raffaele Corsini, Milan (IT); Danilo Caccioli, Sesto San Giovanni (IT)

(73) Assignee: PGT Photonics S.p.A., Milan (IT)

( * ) Notice: Subject to any disclaimer, the term of this patent is extended or adjusted under 35 U.S.C. 154(b) by 506 days.

(21) Appl. No.: 11/802,011

(22) Filed: May 18, 2007

(65) Prior Publication Data
US 2007/0223085 A1 Sep. 27, 2007

Related U.S. Application Data

(62) Division of application No. 10/522,555, filed as application No. PCT/EP2002/008526 on Jul. 31, 2002, now Pat. No. 7,253,944.

(51) Int. Cl.
*H04B 10/17* (2006.01)
*H04B 10/12* (2006.01)

(52) U.S. Cl. ............... 359/334; 359/341.31; 359/341.33

(58) Field of Classification Search ............ 359/341.31, 359/341.33, 334
See application file for complete search history.

(56) References Cited

U.S. PATENT DOCUMENTS

| | | |
|---|---|---|
| 6,618,192 B2 | 9/2003 | Islam et al. |
| 6,903,863 B1 | 6/2005 | Carniel et al. |
| 7,054,060 B2 | 5/2006 | Hainberger et al. |
| 2002/0063948 A1* | 5/2002 | Islam et al. ................. 359/334 |
| 2002/0149838 A1 | 10/2002 | Wang et al. |
| 2002/0163712 A1 | 11/2002 | Hamoir |

FOREIGN PATENT DOCUMENTS

| | | |
|---|---|---|
| WO | WO 02/058198 A2 | 7/2002 |
| WO | WO 02/058198 A3 | 7/2002 |

OTHER PUBLICATIONS

Kobayashi, K., "Fiber Raman Amplifier and Fiber Raman Laser", Patent Abstracts of Japan, JP. No. 200109026, Apr. 20, 2001.

(Continued)

*Primary Examiner*—Eric Bolda
(74) *Attorney, Agent, or Firm*—Finnegan, Henderson, Farabow, Garrett & Dunner LLP (57) ABSTRACT

A Raman amplifier comprises at least a first and a second optical Raman-active fiber disposed in series with each other. A first pump source is connected to the first Raman-active fiber, and is adapted for emitting and coupling into the first Raman-active fiber a first pump radiation including a first group of frequencies. A second pump source is connected to the second Raman-active fiber, and is adapted for emitting and coupling into the second Raman-active fiber a second pump radiation including a second group of frequencies. The whole of said first and second group of frequencies extends over a pump frequency range having a width of at least the 40% of the Raman shift. The minimum and the maximum frequency in each of said first and second group of frequencies differ with each other of at most the 70% of said Raman shift.

11 Claims, 7 Drawing Sheets

OTHER PUBLICATIONS

Krummrich, P. M. et al., "Bandwidth Limitations of Broadband Distributed Raman Fiber Amplifiers for WDM Systems", OFC 2001, Optical Fiber Communication Conference and Exhibit. Technical Digest Post Conference Edition (IEEE CAT. 01CH37171, OFC 2001. Optical Fiber Communication Conference and Exhibition. Technical Digest, Anaheim, CA, USA, vol. 1, pp. MI3/1-3, (Mar. 17-22, 2001).

Fludger, C. R. S., et al., "Fundamental Noise Limits in Broadband Raman Amplifiers", OFC 2001, Optical Fiber Communication Conference and Exhibit. Technical Digest Post Conference Edition (IEEE CAT. 01CH37171, OFC 2001. Optical Fiber Communication Conference and Exhibition. Technical Digest, Anaheim, CA, USA, vol. 1, pp. MA5/1-3, (Mar. 17-22, 2001).

Kidorf, H. et al., "Pump Interactions in a 100-nm Bandwidth Raman Amplifier", IEEE Photonics Technology Letters, vol. 11, No. 5, pp. 530-532, (May 1999).

Zhou, X. et al., "A Simplified Model and Optimal Design of a Multiwavelength Backward-Pumped Fiber Raman Amplifier", IEEE Photonics Technology Letters, vol. 13, No. 9, pp. 945-947, (Sep. 2001).

Kado, S. et al., "Broadband Flat-Noise Raman Amplifier Using Low-Noise Bi-Directionally Pumping Sources", ECOC 2001, 2 Sheets, (2001).

* cited by examiner

MULTI-STAGE RAMAN AMPLIFIER

CROSS REFERENCE TO RELATED APPLICATION

This application is a divisional of U.S. application Ser. No. 10/522,555, filing date Dec. 28, 2005 now U.S. Pat. No. 7,253,944, which is a national phase application based on PCT/EP2002/008526, filed Jul. 31, 2002, which is incorporated herein by reference in its entirety.

The present invention relates to a method for amplifying optical signals in a multi-stage Raman amplifier and to a multi-stage Raman amplifier. In particular, the present invention relates to a method for amplifying optical signals in a lumped multi-stage Raman amplifier and to a lumped multi-stage Raman amplifier.

The maximum number of dense wavelength-division-multiplexed (DWDM) signals that can be transmitted over a single optical fiber has been rapidly increasing over the last few years. This trend, coupled with an increasing data rate per signal, has lead to a profound increase in the amount of signal power propagating through such optical fibers, in order to sustain applications such as data communications and the Internet. This has created a simultaneous demand for large bandwidth and high output power from the optical amplifiers used in such systems.

Erbium-doped fiber amplifiers (EDFAs) are a relatively mature technology. The amount of bandwidth that such amplifiers can produce, however, is fundamentally limited by the physics of the erbium atoms that produce the optical gain in such devices.

Raman amplifiers offer an alternative to EDFAs and are recently attracting much attention in DWDM systems, due to their distinctive flexibility in bandwidth design and growing maturity of high-power pump module technology. Raman amplifiers offer several advantages: low noise, flexible use of signal wavelengths (since the Raman gain peak is mainly dependent on the pump wavelength and not on the emission cross section of a dopant) and a broad gain bandwidth (multiple pumps can be employed). In particular, multi-wavelength pumping allows to extend the wavelength range over which flat Raman gain can be achieved: the total gain profile of such amplifiers consists of a superposition of the contributions from each individual pump.

On the other hand, many factors must be considered in the design of the amplifier and systems that use them. A thorough understanding of some key factors is required, such as, for example, pump-to-pump power transfer, signal-to-signal power transfer, pump depletion, double Rayleigh scattering (DRS) and amplifier spontaneous noise. H. Kidorf et al., in their article "*Pump interactions in a 100-nm Bandwidth Raman amplifier*", IEEE Photonics Technology Letters, vol. 11, no. 5, pag. 530-2 (1999), disclose a computer model that simulates all the physical properties that affect the above listed factors. The computer model numerically solves a differential equation. The authors used their model in order to design a distributed Raman amplifier with a 100-nm bandwidth and with minimum gain variation. The amplifier was designed to have a total output power of 50 mW for 100 channels spaced 1 nm/channel. The intended use of the amplifier was the compensation of 45-km fiber spans (intended for 10.000 km transmission) made of pure silica core fiber plus an extra 3 dB to compensate for internal losses (WDM coupler, isolator, etc.). In a first attempt, the authors tried to evenly space eight pumps between 1432 and 1516 nm. With the goal of implementing the amplifier with semiconductor pumps, a maximum pump power of 120-130 mW per pump was chosen. According to the authors, the result of this simplistic design was a very poor amplifier: the gain variation of the amplifier was 10.5 dB due to power being transferred from the low wavelength pumps to the high wavelengths pumps. The added power in the high wavelengths pumps caused excessive gain at the higher signal wavelengths. Through iterative modeling, the authors arrived at a pump scheme whereby a large energy density at low wavelengths provides pump power for both the high wavelength pumps and the low wavelength signals. By properly balancing the pump's spectral density, an amplifier with a peak-to-peak gain ripple of 1.1 dB was designed.

Another known approach for obtaining a flat Raman gain on broad bandwidths using multi-wavelength pumping is to carefully select the magnitude of each contribution in order to achieve the desired gain profile. For example, P. M. Krummrich et al, "*Bandwidth limitations of broadband distributed Raman fiber amplifiers for WDM systems*", OFC 2001, vol. 1 pag. MI3/1-3, analyze the impact of pump interactions both numerically and experimentally. Their numerical model works by integrating a set of coupled differential equations describing the propagation of pump and signal radiation in the transmission fiber. For the experiments, the authors use a multi-channel pump unit. The pump radiation in the wavelength range of 1409-1513 nm is generated by high power laser diodes and combined by a WDM coupler. More particularly, seven pump channels have been used in a counter-directional pump configuration to achieve flat gain in the wavelength range of 1530-1605 nm with the following set of pump wavelengths: 1424, 1438, 1453, 1467, 1483, 1497 and 1513 nm. The launch powers have been adjusted to achieve an average gain of 10 dB with a gain variation of less than 0.5 dB. According to the authors, the strongest impact of pump interactions can be observed for the channels with the shortest and longest wavelength. The pump channel at 1424 nm experiences 11 dB of additional loss and the channel at 1513 nm experiences 7 dB gain. Further, according to the authors, should the overall gain be increased, it is quite difficult to predict which pump diode output power has to be increased by which amount, due to the energy transfer between the pumps. For gain values higher than 10 dB, due to the strong impact of pump interactions and the resulting gain tilt, the gain at the long wavelength side always grows stronger than the gain at the short wavelength side if any of the pump laser output powers is increased. According to the authors, this effect limits the maximum value of flat gain for a signal wavelength range of 75 nm to approximately 19 dB.

Another numerical model is disclosed in X. Zhou et al., "*A Simplified Model and Optimal Design of a Multiwavelength Backward-Pumped Fiber Raman Amplifier*", IEEE Photonics Technology Letters, vol. 13, no. 9, pag. 945-7 (2001). The authors obtain a closed-form analytical expression for pump power evolution. Based on the obtained analytical expression, formulas for calculating the small-signal optical gain and noise figure are then presented. The application of the developed model in pump optimization design is also discussed. In order to obtain the design for a wide-band optical amplifier having a flat gain, the authors use the following parameters: maximal pump light frequency 214.2 THz (1400 nm), minimal pump light frequency 200 THz (1500 nm), fiber loss at the pump frequency 0.3 dB/km, fiber loss at the signal frequency 0.2 dB/km, fiber length 10 km, required gain 20 dB, number of channels 100 (from 1510 to 1610 with 1 nm separation), fiber effective area 50 μm². By considering three pump wavelengths, the authors obtain the optimal pump wavelength at 1423, 1454 and 1484 nm, and the corresponding optimal pump power as 1.35, 0.19 and 0.20 W, respectively. By considering six pump wavelengths, the authors obtain the optimal pump wavelength as 1404, 1413, 1432, 1449, 1463 and 1495 nm, and the corresponding optimal pump power as 0.68, 0.6, 0.44, 0.19, 0.076 and 0.054 W, respectively. It is shown that the gain ripple can be compressed definitely by increasing the number of pump light sources. However, the noise performance of the six-pump amplifier is worse than that of the three-pump amplifier. According to the authors, this is because the six-pump amplifier has a pump at higher wavelength (1495 nm). More particularly, FIG. 1 of the article shows a noise figure ranging from about 7.5 dB at 1510 nm to about 4 dB at 1610 nm for the six-pump amplifier. On the other hand, FIG. 1 of the article shows a gain variation of about 5 dB in the whole wavelength range for the three-pump amplifier.

US patent application no. 2002/0044335 discloses an amplifier apparatus including an optical transmission line with a Raman amplification region that provides a pump to signal power conversion efficiency of at least 20%. The Raman amplification region is configured to amplify a signal with multiple wavelengths over at least a 30 nm range of wavelengths, preferably over at least a 50 nm range of wavelengths, more preferably over at least a 70 nm range of wavelengths. A pump source is coupled to the optical transmission line. An input optical signal is amplified in the Raman amplification region and an output signal is generated that has at least 100 mW more power than the input optical signal. In one disclosed embodiment, the amplifier apparatus had more than 3.2 dB of gain over 105 nm utilizing a Lucent DK-20 dispersion compensating fiber. 1 dB of loss was assumed to be present at both ends of the gain fiber. This fiber was pumped with 250 mW at 1396, 1416 and 1427 nm, 150 mW at 1450 nm, 95 mW at 1472 nm and 75 mW at 1505 nm. Ten input signals at 1520, 1530, 1540, 1550, 1560, 1570, 1580, 1590, 1600 and 1610 nm had 12 mW of power and were counterpropagating with respect to the pump wavelengths. FIG. 6 of the '44335 patent application shows the noise figure of this amplifier, ranging from about 7.5 dB at 1520 nm to about 6 dB at 1610 nm. In an embodiment disclosed as "all band Raman amplifier", the amplifier apparatus includes a transmission line with two Raman amplification regions. Two WDMs are provided. Shorter signal wavelengths can receive more gain in one of Raman amplification regions than in the other. A lossy member can be positioned between the Raman amplification regions. The lossy member can include at least one of an add/drop multiplexer, a gain equalization element, an optical isolator or a dispersion compensating element. One WDM receives a first set of pump wavelengths provided by a first pump source and the WDM between the two amplification regions receives a second set of pump wavelengths which can provide gain to the optical signal and extract optical energy from at least a portion of the first set of pump wavelengths. The second set of wavelengths is provided by a second pump source. The WDM between the two amplification regions can substantially pass signal wavelengths as well as at least a portion of the first set of pump wavelengths between the two Raman amplification regions. According to the authors, a gain flatness of the all band Raman amplifier can be optimized by a gain flattening filter, and/or by pump wavelengths, pump powers, the number of pumps and the lengths of Raman gain fibers.

JP patent application no. 2001-109026 discloses a fiber Raman light amplifier using tellurite glass as a light amplification medium. More particularly, it discloses a fiber Raman amplifier constituted by using three lines of tellurite fibers whose lengths are respectively 150 m and three exciting light sources whose wavelengths are respectively 1370 nm, 1400 nm and 1430 nm, and by connecting three units in which the tellurite glass fibers and the exciting light sources are respectively combined in series and the amplifier is excited by making respective input power of exciting lights to be 200 mW (totally 600 mW). A gain equal to or larger than 23 dB is obtained in a 100 nm band extending from 1.5 to 1.6 µm.

A further problem related to Raman amplifiers is that backward and multi-wavelength pumping scheme results in larger noise figures for shorter wavelength signals, due to pump-to-pump stimulated Raman scattering, in addition to thermal noise and wavelength-dependence of fiber attenuation coefficients. C. R. S. Fludger et al., "*Fundamental Noise Limits in Broadband Raman Amplifiers*", OFC 2001, MA5/1-3, show that broadband discrete Raman amplifiers based on silica-germania will have a noise figure significantly greater than the quantum limit. According to the authors, in a discrete Raman amplifier the wavelength dependence of the noise figure is determined by four main factors. These include the gain spectrum and component losses at the amplifier input. Also, stimulated Raman scattering (SRS) will transfer power from the shorter wavelength pumps to the longer wavelength pumps. Finally, noise figure is also affected by increased spontaneous emission due to the thermal distribution of phonons in the ground state. In particular, if a pump provides a large amount of gain to a closely spaced signal there will be a large increase in the excess spontaneous noise. If the ratio of the gain given by that pump to the overall total gain from all the pumps is small, the noise figure will tend to 3 dB. The authors evaluate the best achievable internal noise figure for a five wavelength-pumped discrete Raman amplifier. The relative gains from each pump were chosen to give the broadest and flattest spectrum with the highest pump wavelength at 1495 nm and the lowest signal near 1500 nm. It is shown that since a substantial amount of the total gain at shorter signal wavelengths is given by the 1495 nm pump, there is increased spontaneous emission as the signals approach the pump. At room temperature, the internal noise figure of the amplifier is between 5 and 6 dB below 1520. However, the total noise figure of the amplifier will be greater than this once fiber loss and the insertion loss of components at the amplifier input are included.

S. Kado et al., "*Broadband flat-noise Raman amplifier using low-noise bi-directionally pumping sources*", ECOC 2001, propose and experimentally demonstrate an optimized bi-directional pumping scheme that realizes a less than 0.7 dB flatness over C- and L-bands of both Raman gain and optical noise figure, simultaneously. In order to use forward-pumping, for the proposed method, a new type of pump laser having low relative intensity noise (RIN) is also developed. Such laser is a wavelength-stabilized multimode pump laser, where the laser chip has an internal grating layer along laser cavity for selecting more than three longitudinal modes. The RIN of the developed laser is more than 20 dB lower than a usual fiber Bragg grating stabilized laser. According to the authors, this development allows to use forward pumping scheme without significantly hurting the signal quality due to poor RIN characteristics.

Known configurations of Raman amplifiers, such as those presented above, may achieve high and flat gain in broad wavelength ranges. However, typically this goes with an unbalanced noise figure, having higher values for shorter signal wavelengths and lower values for longer signal wavelengths (except for the amplifier disclosed by Kado et al., that use a special type of pump laser in order to obtain a flat noise figure). The Applicant notices that the higher noise figure of shorter signal wavelengths may raise problems in some configurations of optical system including Raman amplifiers, in that at least a portion of the shorter signal wavelengths may risk going outside system specifications.

Further, known configurations of Raman amplifiers, especially those achieving a flat gain on a broad band of wavelengths, typically use very high power values for shorter pump wavelengths (in excess of 500 mW), due to transfer of energy between shorter pump wavelengths and longer pump wavelengths. The Applicant notices that this is not an optimal solution. In fact, reliable semiconductors lasers having a power emission in excess of 500 mW are now hardly available on the market and/or costly, so that multiple lasers having lower power emission should be used. As a consequence, the cost of the overall amplifier and/or the space occupied by the pump sources may disadvantageously increase.

The Applicant has tackled the problem of lowering the noise figure of shorter wavelength signals, at the same time maintaining a low value of noise figure of longer wavelength signals, in a multi-wavelength pumped, high gain, broadband Raman amplifier, without the necessity of using a special type of laser. The Applicant has also tackled the problem of reaching such low noise figure and high gain with relatively low power per pump wavelength.

The Applicant has found that it is possible to lower the noise figure of shorter signal wavelengths by splitting the optical path in which the Raman gain is obtained in at least two optical path portions. The different optical path portions are pumped by respective pumping radiations having optical frequencies included in respective frequency ranges. Each frequency range does not extend more than 70% of the Raman shift of the Raman gain material. The transfer of energy between shorter and longer wavelength pumping radiations due to stimulated Raman scattering is, in such manner, greatly reduced in each optical path portion. The lowering of energy transfer between shorter and longer wavelength pumping radiations makes practically unnecessary to launch the shorter wavelength pumping radiations with a higher energy. This has the effect of lowering the noise figure of the shorter signal wavelengths, with the further advantage that a lower power per pump wavelength can be used also for the shorter wavelengths pumping radiations. Since the shorter wavelength pumping radiations do not work in saturation regime in any of the optical path portions wherein Raman gain is obtained, a lower noise figure of the amplifier is obtained. Furthermore, a broad and flat Raman gain may be obtained by arranging the pump sources so as to provide substantially the same pumping power per wavelength. This is of particular advantage, in that all the needed pump sources may have the same average reliability and lifetime.

In a first aspect, the invention relates to a method for amplifying an optical signal having frequency in a signal frequency range, said method comprising introducing said optical signal respectively into at least a first and a second optical paths disposed in series with each other, each comprising a Raman-active material having a predetermined Raman shift;

introducing into said first optical path a first pump portion, said first pump portion including a first group of pump frequencies between a first minimum pump frequency and a first maximum pump frequency;

introducing into said second optical path a second pump portion, said second pump portion including a second group of pump frequencies between a second minimum pump frequency and a second maximum pump frequency, a whole of said first and second group of frequencies extending over a pump frequency range having a width of at least the 40% of said Raman shift;

the method being characterized in that at least a portion of said first group of frequencies is not included in said second group of frequencies and at least a portion of said second group of frequencies is not included in said first group of frequencies;

said steps of introducing said first and second pump portions into said first and second optical paths are performed such that a residual of said second pump portion entering into said first optical path has a power lower by 10 dB than said first pump portion, and such that a residual of said first pump portion entering into said second optical path has a power lower by 10 dB than said second pump portion;

said first minimum pump frequency and said first maximum pump frequency differ with each other of at most the 70% of said Raman shift; and said second minimum pump frequency and said second maximum pump frequency differ with each other of at most the 70% of said Raman shift.

Preferably, said steps of introducing said first and second pump portions into said first and second optical paths are performed such that a residual of said second pump portion entering into said first optical path has a power lower by 13 dB than said first pump portion, and such that a residual of said first pump portion entering into said second optical path has a power lower by 13 dB than said second pump portion.

In preferred embodiments, said first minimum pump frequency and said first maximum pump frequency differ with each other of at most the 50% of said Raman shift, and said second minimum pump frequency and said second maximum pump frequency differ with each other of at most the 50% of said Raman shift.

Advantageously said pump frequency range may have a width of at least the 50% of said Raman shift.

Preferably, said first and second group of frequencies do not overlap with each other.

In preferred embodiments, at least one of the ranges defined between, respectively, said first minimum and said first maximum pump frequencies, and said second minimum and said second maximum pump frequencies, has a width of at least the 20% of said Raman shift.

Advantageously, the first group of frequencies is adapted for Raman amplifying a first portion of said optical signal having a greater attenuation versus wavelength in said Raman-active material than said second portion of optical signal, amplified by said second group of frequencies.

The first and said second pump portions may be provided by a plurality of pump lasers, said plurality of pump lasers having an overall variation of pump power emission of at most the 50% of an average pump power emission.

In a second aspect, the invention relates to a Raman amplifier, adapted for amplifying an optical signal having frequency in a signal frequency range, comprising at least a first and a second optical paths disposed in series with each other, each comprising a Raman-active material having a predetermined Raman shift, said amplifier comprising:

a first pump source connected to said first optical path, said first pump source being adapted for emitting and coupling into said first optical path a first pump radiation including a first group of pump frequencies between a first minimum pump frequency and a first maximum pump frequency;

a second pump source connected to said second optical path, said second pump source being adapted for emitting and coupling into said second optical path a second pump radiation including a second group of pump frequencies between a second minimum pump frequency and a second maximum pump frequency, a whole of said first and second group of frequencies extending over a pump frequency range having a width of at least the 40% of said Raman shift;

characterized in that at least a portion of said first group of frequencies is not included in said second group of frequencies and at least a portion of said second group of frequencies is not included in said first group of frequencies;

the couplings between said first and second pump sources and said first and second optical paths are such that a residual of said second pump radiation coupled into said first optical path has a power lower by 10 dB than said first pump radiation, and such that a residual of said first pump radiation coupled into said second optical path has a power lower by 10 dB than said second pump radiation;

said first minimum pump frequency and said first maximum pump frequency differ with each other of at most the 70% of said Raman shift; and said second minimum pump frequency and said second maximum pump frequency differ with each other of at most the 70% of said Raman shift.

Preferably, the couplings between said first and second pump sources and said first and second optical paths are such that a residual of said second pump radiation coupled into said first optical path has a power lower by 13 dB than said first pump radiation, and such that a residual of said first pump radiation coupled into said second optical path has a power lower by 13 dB than said second pump radiation.

In preferred embodiments, said first minimum pump frequency and said first maximum pump frequency differ with each other of at most the 50% of said Raman shift, and said second minimum pump frequency and said second maximum pump frequency differ with each other of at most the 50% of said Raman shift.

Advantageously, said pump frequency range may have a width of at least the 50% of said Raman shift.

Preferably, said first and second group of frequencies do not overlap with each other.

In preferred embodiments, at least one of the ranges defined between, respectively, said first minimum and said first maximum pump frequencies, and said second minimum and said second maximum pump frequencies, has a width of at least the 20% of said Raman shift.

Advantageously, the first group of frequencies is adapted for Raman amplifying a first portion of said optical signal having a greater attenuation versus wavelength in said Raman-active material than said second portion of optical signal, amplified by said second group of frequencies.

In preferred embodiments, said first and said second pump sources comprise a plurality of pump lasers, said plurality of pump lasers having an overall variation of pump power emission of at most the 50% of an average pump power emission.

In a third aspect, the invention relates to an optical system comprising at least one optical line, said optical line including at least one optical fiber and at least one Raman amplifier according to the second aspect, connected to said optical fiber.

The optical system typically further comprises a transmitting station including a plurality of transmitters adapted for emitting a respective plurality of optical channels, each having a respective wavelength, said transmitting station being connected to a first end of said optical line.

The optical system typically further comprises a receiving station including a plurality of receivers adapted to discriminate an information carried by said optical channels, said receiving station being connected to a second end of said optical line.

Further features and advantages of the present invention will be better illustrated by the following detailed description, herein given with reference to the enclosed drawings, in which.

Figure 1:
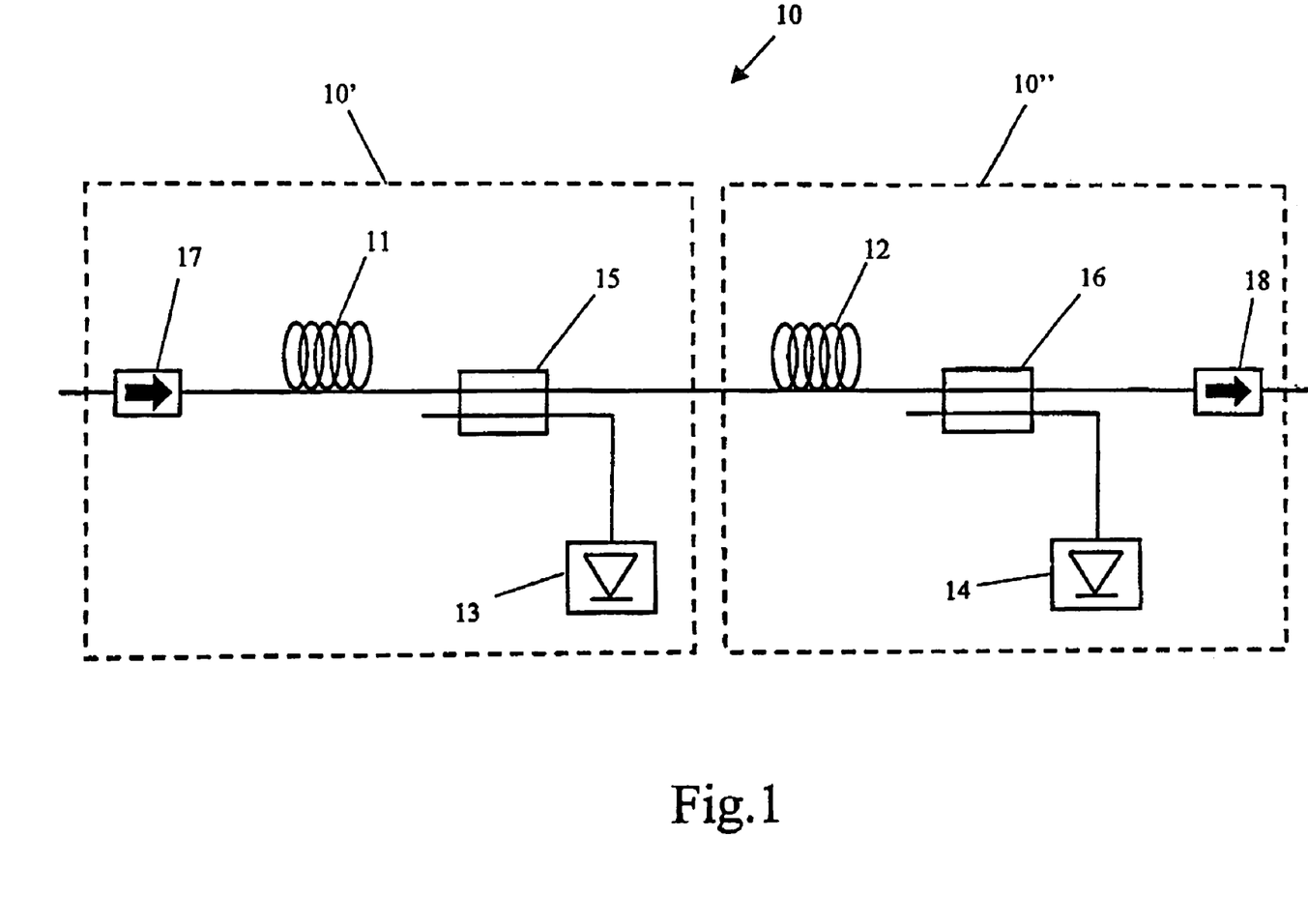
FIG. 1 schematically shows a first embodiment of a Raman amplifier according to the present invention.

FIG. 1 shows a first embodiment of a Raman amplifier 10 according to the present invention. The amplifier 10 may be a lumped Raman amplifier. Amplifier 10 include at least two stages 10' and 10", disposed in series with each other. The following detailed description will be made with specific reference to a Raman amplifier having only two stages: however, the skilled in the art may adapt the teachings of the present invention to any number of needed amplifier stages, according to the different specifications. Odd reference numbers are used in FIG. 1 for indicating components included in the first stage 10', whereas even reference numbers are used in FIG. 1 for referring to components included in the second stage 10". More particularly, first stage 10' comprises a first length of Raman active optical fiber 11, a first pump source 13 and a first coupling device 15.

Second stage 10" comprises a second length of Raman active optical fiber 12, a second pump source 14 and a second coupling device 16. Preferably, the first stage 10' includes also a unidirectional device 17 adapted for passing optical signal radiations in one direction and for blocking the same in the opposite direction, such as an isolator or a circulator. Unidirectional device 17 may be disposed at the input and/or at the output of the first stage 10'. Preferably, also the second stage 10" includes a unidirectional device 18 adapted for passing optical signal radiations in one direction and for blocking the same in the opposite direction, such as an isolator or a circulator. Unidirectional device 18 may be disposed at the input and/or at the output of the second stage 10". In a preferred embodiment, a single unidirectional device is used in the amplifier 10 between the first stage 10' and the second stage 10". In such embodiment, the presence of the unidirectional device between the first and second stage may greatly reduce the occurrence of double Rayleigh scattering in the Raman amplifier 10.

The Raman amplifier 10 is suitable for amplifying a broadband WDM optical signal, i.e. an optical signal with multiple wavelengths included in a range of at least 50 nm, preferably of at least 70 nm. A wavelength range around 1550 nm may be used for the optical signal. Preferably, the optical signal may comprise one or more signal wavelengths $\lambda_s$ greater than or equal to about 1460 nm, more preferably greater than or equal to about 1510 nm. Preferably, the optical signal may comprise one or more signal wavelengths $\lambda_s$ lower than or equal to about 1650 nm, more preferably lower than or equal to about 1625 nm. Alternatively, a wavelength range around 1300 nm may be used for the optical signal, for example between 1280 nm and 1340 nm. Over the wavelength range of the optical signal to be amplified, the Raman amplifier may preferably provide a gain of at least 5 dB, more preferably of at least 10 dB, even more preferably of at least 20 dB. These preferred values of gain also apply for distributed amplification, provided that the on-off gain is considered. Over the wavelength range of the optical signal to be amplified, the amplifier 10 may preferably obtain a maximum gain variation of 3 dB, more preferably of 2 dB, even more preferably 1 dB. Preferably, the noise figure of the amplifier 10 may be lower than or equal to 8 dB, more preferably lower than or equal to 7 dB, over the wavelength range of the signal to be amplified. For the purposes of the present invention, by "noise figure of the amplifier" NF it has to be intended a value calculated with the following formula:

$$NF = P(ASE)GhvB_0 + \frac{1}{G}$$

wherein P(ASE) is the power of the amplifier spontaneous emission, G is the amplifier gain, $B_0$ is the receiver optical bandwidth (i.e. typically the bandwidth of a demultiplexer connected to a wide bandwidth photodiode), h is the Planck's constant and v is the signal optical frequency.

The Raman-active optical fibers 11, 12 are optical fibers suitable for obtaining a gain by stimulated Raman scattering. In the present detailed description, specific reference is made to Raman-active optical fibers for obtaining Raman gain in the Raman amplifier 10: however, the skilled in the art may adapt the teachings of the present invention with other types of optical paths including any Raman-active material (i.e. a material being capable of providing an optical gain by stimulated Raman scattering), such as, for example, integrated optical waveguides. For example, the Raman-active fibers 11, 12 may be silica-based fibers. Typically, such silica-based fibers have a core comprising germanium or another dopant suitable for enhancing the Raman effect inside the core, such as for example phosphorus or boron. In another embodiment, the Raman-active fibers may be tellurite-based fibers. In preferred embodiments, the Raman-active fibers 11, 12 may be microstructured fibers, i.e. fiber structures that incorporate numerous air holes surrounding a solid core. Preferably, the sum of the lengths of the Raman-active fibers 11, 12 may be lower than or equal to about 10 km, more preferably lower than or equal to about 8 km. A lower total length of the Raman-active fibers 11, 12 contributes to keeping the noise figure of the amplifier 10 lower. On the other hand, in order to obtain a sufficient Raman gain, the length of each Raman-active fiber 11, 12 may be at least 100 m, preferably at least 200 m, more preferably at least 1000 m. Preferably, the effective area of the Raman-active fibers 11, 12 may be lower than or equal to 60 $\mu m^2$, more preferably lower than or equal to 35 $\mu m^2$, even more preferably lower than or equal to 20 $\mu m^2$. A lower effective area increases the nonlinear effects inside the core of the Raman-active fibers 11, 12, such as the stimulated Raman scattering, exploited for Raman amplification. Preferably, the ratio between the Raman gain coefficient and the effective area $g_R/A_{eff}$ of the Raman-active fibers 11, 12 is of at least 1.0/(W·km), more preferably of at least 3.0 1/(W·km), even more preferably of at least 6.0 1/(W·km). A higher ratio between the Raman gain coefficient and the effective area of the Raman-active fibers 11, 12 allows to obtain a higher Raman gain per unit length of fiber. This keeps the noise figure of the amplifier lower, as a lower length of Raman-active fiber may be used for obtaining the desired signal amplification. Another important parameter that may have an impact on the Raman amplification and, more particularly, on the noise figure, is the attenuation of the Raman-active fibers 11, 12: preferably, such attenuation may be lower than or equal to 2.0 dB/km, more preferably lower than or equal to 1.5 dB/km, at the pump wavelength. At the signal wavelength, the attenuation of the Raman-active fibers may be preferably lower than or equal to 1.0 dB/km, more preferably lower than or equal to 0.7 dB/km.

The pump sources 13, 14 may each comprise one or more laser diodes. Preferably, the laser diodes have high output power, i.e. at least 50 mW. Preferably, the wavelength emission of the laser diodes may be controlled, for example with an external fiber Bragg grating. Typically, the laser diodes may emit polarized pump radiation and include a polarization maintaining fiber length. In a preferred embodiment, two laser diodes may be combined for each pump wavelength, for example by a polarization beam combiner, in order to achieve a high output power and a polarization-independent Raman gain. Several pump wavelengths may be combined together, typically by using wavelength division multiplexers (WDMs). Preferably, each pump source 13, 14 may provide an overall pump power of at least 100 mW, more preferably of at least 200 mW. The wavelength of the radiation emitted by the laser diode or diodes included in the pump sources 13, 14 is related to the signal radiation wavelengths: in order to have Raman amplification, the wavelength emission of the laser diodes should be shifted with respect to the signal radiation wavelengths: in a lower wavelength region of the spectrum, according to the Raman shift of the material included in the core of the Raman-active fibers 11, 12, i.e., according to the shift corresponding to a peak in the Raman spectrum of the material (see G. P. Agrawal, "Nonlinear Fiber Optics", Academic Press Inc. (1995), pag. 317-319). For example, for amplification of optical signals in a range comprised between 1460 and 1650 nm and using silica-based optical fibers, the pump radiation wavelengths may be comprised approximately between 1360 and 1550 nm, as the Raman shift of silica-based fibers is around 100 nm in such wavelength range. Other materials may exhibit a different Raman shift. For the purposes of the present invention, it is convenient to refer also to the optical frequency of the pump radiation emitted by the pump sources 13, 14, in addition to its wavelength. Furthermore, it is also convenient to express the Raman shift in terms of frequency. In fact, the Raman shift of a Raman-active material is substantially constant in the range of frequencies of interest for optical communications: for example, for silica-based or silica/germania-based optical fibers the Raman shift is 13.2 THz. This means that independently on the frequency of the pump radiation used, an amplification due to stimulated Raman scattering is obtained in silica-based or silica/germania-based optical fibers in a frequency interval around a maximum disposed at a frequency shifted of 13.2 THz with respect to the pump frequency. Other materials (e.g. tellurite-based glasses) may present plural Raman peaks that can be exploited for Raman amplification. Advantageously, the frequency shift corresponding to the peak having maximum height may be chosen in order to place the pump frequency range adapted for amplifying signals in a given signal frequency range. Such choice may also be influenced by other factors, such as for example the width of the Raman peak, or the position of the Raman peak. As a matter of fact, a thin peak may be hardly used for designing a Raman amplifier, whereas the position of the Raman peak may be related, for example, to the availability of pump lasers having the desired frequency and power emission.

Figure 7:
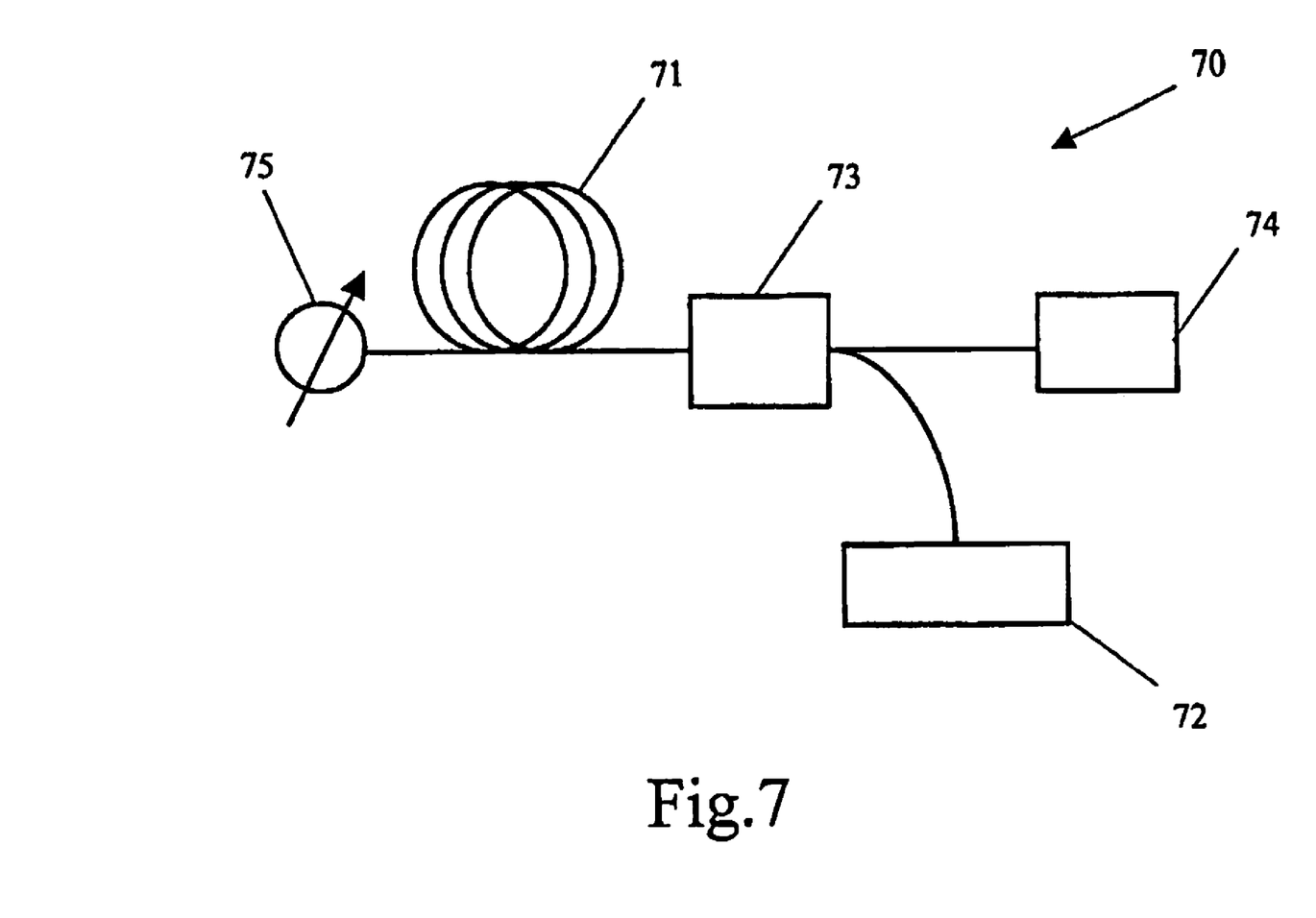
FIG. 7 shows an experimental apparatus for measuring the Raman shift.

The Raman spectrum of a material may be obtained with conventional techniques. For example, it can be obtained by using the apparatus 70 as shown in FIG. 7, including a Raman-active fiber 71 under test, an unpolarized pump source 72 connected by a WDM coupler 73 to the Raman-active fiber 71, an optical spectrum analyzer 74 and an attenuator 75. By coupling a pump radiation having whatever frequency and a power of at least 200 mW in the Raman-active fiber 71 without any input signal to be amplified, it is possible to measure with the spectrum analyzer 74 the spontaneous emission (ASE) caused in the Raman-active fiber 71 by the pump radiation. The spectrum analyzer 74 is connected to the WDM coupler 73 so as to measure the ASE propagating in opposite direction with respect to the propagation direction of the pump. In such way, the measure is not influenced by the high power of the pump radiation exiting from the Raman-active fiber 71 on the opposite side with respect to the input of the pump radiation. The attenuator 75 allows to avoid injuries of an operator during the measure and/or to drastically reduce back-reflections of the pump radiation exiting at the end of the Raman-active fiber 71. Then, the Raman shift of the material included in the Raman-active fiber 71 may be derived by the ASE spectrum as the absolute value of the difference between the frequency of the peak of the ASE spectrum obtained at the spectrum analyzer 74 and the frequency of the pump radiation used. The measure may be performed at room temperature. In case of a spectrum including different peaks, if the measure is performed with the maximum pump frequency of the chosen pump frequency range, the Raman shift corresponds to the absolute value of the difference between the frequency of the highest peak included in a frequency range corresponding to the signal frequency range and the frequency of the pump.

The obtaining of the Raman spectrum may be also performed with different input signals having respective different frequencies: by measuring the gain obtained by each signal frequency, the value of the Raman shift can be obtained as the absolute value of the difference between the signal frequency corresponding to the gain peak and the frequency of the pump radiation used. The measure may be performed at room temperature. In case of a spectrum including different peaks, if the measure is performed with the maximum pump frequency of the chosen pump frequency range, the Raman shift corresponds to the absolute value of the difference between the frequency of the highest peak included in a frequency range corresponding to the signal frequency range and the frequency of the pump.

In order to obtain a significant amplification in a broad wavelength range of an optical signal, multiple pump frequencies are used In the amplifier 10 of the invention. The whole of the multiple pump frequencies provided by both pump sources 13, 14 extend over a wide frequency range, i.e. at least 40% of the Raman shift of the material included in the Raman active fibers 11, 12, preferably at least 50% of the Raman shift of the material included in the Raman active fibers 11, 12, more preferably at least 60% of the Raman shift of the material included in the Raman active fibers 11, 12, even more preferably at least 70% of the Raman shift of the material included in the Raman active fibers 11, 12.

The coupling devices 15 and 16 may be wavelength division multiplexers. In the preferred embodiment shown in FIG. 1, they introduce the pumping radiation provided by the pump sources 13, 14 in an opposite direction with respect to the optical signal to be amplified, so as to have counter-propagating Raman amplification in the Raman-active optical fibers 11, 12. A co-propagating configuration or a mixed co- and counter-propagating configuration of the Raman amplifier 10 may also be used.

The first stage 10' and the second stage 10" of the Raman amplifier 10 are configured so that they are substantially isolated with each other in the pump wavelength range. In other words, the pump source 13 of the first stage 10' substantially provides pump radiation only to the first Raman-active fiber 11 and the pump source 14 of the second stage 10" substantially provides pump radiation only to the second Raman-active fiber 12. If any pump residual remains from the amplification process in any of the first or second stage 10', 10", this is substantially blocked or filtered, so that it cannot substantially propagate in the other of the amplifier stages 10' or 10". Pump residuals may also be caused by reflections induced by less-than-perfect coupling between the various components included in the amplifier 10, such as for example the WDMs 15, 16 and the Raman-active fibers 11, 12. Practically, an absence of residual in the first Raman-active fiber length 11 of a pump radiation coming from the second pump source 14 and not used for amplification in the second Raman-active optical fiber 12 may correspond to a power of such residual entering in the first Raman-active fiber 11 lower by at least 10 dB, preferably lower by at least 13 dB, more preferably lower by at least 20 dB, than the pump power coupled in the first Raman-active fiber 11 by the first pump source 13. In the same way, an absence of residual in the second Raman-active fiber length 12 of a pump radiation coming from the first pump source 13 and not used for amplification in the first Raman-active optical fiber 11 may correspond to a power of such residual entering in the second Raman-active fiber 12 lower by at least 10 dB, preferably lower by at least 13 dB, more preferably lower by at least 20 dB, than the pump power coupled in the second Raman-active fiber 12 by the second pump source 14.

With reference to the amplifier configuration shown in FIG. 1, the wavelength division multiplexers may provide the required isolation between the first stage 10' and the second stage 10" for the pump wavelength range. For example, the wavelength division multiplexer 15, disposed between the first and the second Raman-active fiber 11, 12, may be capable of extracting substantially all the pump radiation coming from the second pump source 14, not used for amplification in the second length of Raman-active fiber 12, i.e. the pump residual from the second stage 10", so that such pump residual substantially does not propagate in the first length of Raman-active fiber 11 in the first stage 10'. Such extracted pump residual may be used for monitoring purposes and/or gain control. Typically, an isolation level of at least 10 dB in the pump wavelength range may be sufficient for the wavelength division multiplexers (at least for the WDM 15 in FIG. 1) for providing the required isolation, as a great part of pump power coming from the pump sources 13, 14 is used for Raman amplification in the Raman-active fibers 11, 12. Clearly, in the amplifier configuration shown in FIG. 1, substantially no pump radiation coming from the first pump source 13 propagates in the second length of Raman-active fiber 12 of the second stage 10", except for possible pump reflections at the WDM 15, that can be minimized by a proper coupling. In the counter-propagating configuration shown in FIG. 1, if the WDM coupling device 15 cannot provide by itself a sufficient level of isolation, a unidirectional device may be Interposed between the first stage 10' and the second stage 10", so as to block substantially all the possible pump residual exiting from the second length of Raman-active fiber 12. The unidirectional device may be an isolator or a circulator. The use of a circulator may further allow the elimination of the first coupling device 15, as the first pump source 13 may be suitably connected to one of ports of the circulator. In other embodiments, for example in co-propagating configurations of the Raman amplifier 10, a wavelength selective filter may be included between the first and the second stage 10', 10", the wavelength selective filter being suitable for passing the optical signal radiation and for filtering the pump radiation.

The pump source 13 included in the first stage 10' provides a pump radiation having at least one frequency included in a first group of frequencies. The first group of frequencies defines a first pump frequency range between a first minimum pump frequency and a first maximum pump frequency. The pump source 14 included in the second stage 10" provides a pump radiation having at least one frequency included in a second group of frequencies. The second group of frequencies defines a second frequency range between a second minimum pump frequency and a second maximum pump frequency. The first and the second group of frequencies are not coincident: more particularly, at least a portion of the frequencies included in the first group is not included in the second group and vice-versa. In a preferred embodiment, the first and the second pump frequency ranges do not overlap with each other. In another embodiment, the frequencies of the first group may be interleaved to the frequencies of the second group. The widths of each of the first and the second pump frequency range do not exceed the 70% of the Raman shift of the material included in the Raman-active optical fibers 11, 12, preferably the 60%, more preferably the 50%, even more preferably the 40% of the Raman shift. In preferred embodiments of the Raman amplifier of the invention, each amplifier stage provides a substantial amplification only of a portion of the traveling optical signal, while leaving other signal portions practically not amplified. In fact, with Raman amplification each pump frequency provides a substantial amplification of an optical signal in a frequency range having a width of only about 25-30% of the Raman shift of the material included in the Raman-active fibers 11, 12, centered around a frequency shifted of one Raman shift from the pump frequency. As Raman amplifiers according to the invention use different frequency sub-ranges for the pump radiation in different amplifier stages, each amplifier stage provides substantial amplification only of the shifted frequency sub-range related to the pump frequency sub-range used in the stage, i.e. typically of a sub-range of the whole signal frequency range.

The allocation of the pump frequencies in the different amplifier stages according to the indications given above allows to reduce, or possibly to practically avoid, the transfer of energy between shorter pump wavelengths and longer pump wavelengths in a Raman amplifier. In particular, in the multiple stage amplifier of the invention any transfer of energy between shorter and longer pump wavelengths is reduced, or practically avoided, in all amplifier stages. The Applicant has found that this may reduce the noise figure of the shorter wavelength signals in a broadband Raman amplifier. Let's consider, for example, a first pump wavelength of 1425 nm (frequency $v_p=210.5$ THz) and a second pump wavelength of 1505 nm ($v_p=199.3$ THz). These first and second pump wavelengths may be exploited for Raman amplification of an optical signal comprised in a range between about 1520 and 1610 nm, in a Raman amplifier comprising silica-based or silica/germania-based optical fibers. The corresponding frequencies of these pump radiations differ with each other of 11.2 THz, i.e., of about 85% of the Raman shift of silica-based optical fibers. If such pump radiations were launched in the same Raman-active fiber, a significant portion of the optical power of the first pump wavelength at 1425 nm would be transferred to the second pump wavelength at 1505 nm by stimulated Raman scattering, so that such transferred portion would not be used for amplification of the optical signal. Consequently, the shorter wavelength portion of the optical signal would be less amplified with respect to longer wavelength portion. Accordingly, the power of the pump radiation at 1425 nm should be increased in order to take into account of this effect. However, the transfer of energy between the pump radiation at 1425 nm and the pump radiation at 1505 nm may cause the Raman amplifier to work in saturation regime at the shorter wavelengths. As a matter of fact, an amplifier works in saturation regime when an amplified radiation has almost the same power of the pump radiation in a significant portion of the amplifying medium. In this case, the pump radiation having longer wavelength, amplified by the pump radiation having shorter wavelength, may have almost the same power of the latter in a significant portion of the Raman-active fiber, even in case of an unbalanced launch power of the two pump radiations into the Raman-active fiber. Thus, the shorter pump wavelength may be deeply saturated by the longer pump wavelength, with the inconvenient that the signal portion amplified by the shorter wavelength may have a higher noise figure. In fact, saturation is a more noisy regime for an amplifier with respect to a linear regime.

On the contrary, by configuring the Raman amplifier as a double stage Raman amplifier, by inserting the first pump wavelength of 1425 nm in the first stage and the second pump wavelength of 1505 nm in the second stage, and by isolating the first and the second stage in the pump wavelength range, no transfer of energy may practically occur between the pump wavelength at 1425 nm and the pump wavelength at 1505 nm, so that each amplifier stage may work at a linear or at a low saturation regime, leading to a low noise figure in both stages, i.e., to an overall low noise figure versus wavelength of the amplifier.

In case of use of more pump frequencies, for example in order to obtain a flat gain curve versus wavelength on a broad wavelength range, the distance between the various frequencies has to be considered. For example, the several pump frequencies may be included in an overall pump frequency range having a width nearly equal to the Raman shift of the material exploited for Raman gain.

Following the indications given above, the pumping radiations having a frequency which is distant less than the 70% of the Raman shift from the minimum pump frequency may be for example arranged in one amplifier stage and the pumping radiations having a frequency which is distant more than the 70% of the Raman shift from the minimum pump frequency may be arranged in another amplifier stage. By providing a high isolation in the pump wavelength range between the two amplifier stages, a transfer of energy between shorter and longer pump wavelengths in each amplifier stage is greatly reduced or even avoided, due to the relatively low distance between the minimum pump wavelength and the maximum pump wavelength in each amplifier stage. In particular, the lower the pump wavelength range in each amplifier stage, the lower the interactions between shorter and longer pump wavelengths within each amplifier stage. Further, the isolation between the first and the second amplifier stage may guarantee that practically no transfer of energy may occur between shorter and longer pump wavelengths of the first and of the second amplifier stage. Accordingly, each amplifier stage may work at a linear or at a low saturation regime, leading to a low noise figure in both stages, i.e., to an overall low noise figure versus wavelength of the amplifier.

Ideally, in case of use of several pump frequencies, a possible solution could be to arrange one isolated amplifier stage for each pump frequency, so as to completely avoid any transfer of energy between different pump frequencies. Each amplifier stage would provide, in this case, a substantial amplification only of a very small portion of the traveling optical signal, leaving other signal portions practically not amplified. However, it has to be considered that the isolation required between the different stages in the pump wavelength range has to be provided by suitable components (e.g. WDMs, isolators, wavelength selective filters): each of these components introduces an insertion loss on the optical signal. A further source of loss on the traveling optical signal is also represented by the Raman-above fibers included in the different stages, at least for the portions of optical signal substantially not amplified in the first amplifier stages. In such conditions, the last amplifier stages may receive a very poor level of optical signal power for some portions of optical signal not amplified in the first amplifier stages, with the consequence of a higher noise figure for these portions of optical signal. Thus, when the number of pump frequencies to be used is higher than or equal to three it may be preferred to arrange at least two pump frequencies in a single stage. Preferably, at least one of the first and of the second pump frequency ranges has a width of at least the 20% of the Raman shift of the material included in the Raman-active fibers. This allows to reach a good compromise between the reduction of the transfer of energy between different pump wavelengths on one hand, with a sufficiently low number of amplifier stages on the other hand, so as to maintain an acceptable level of power in the whole wavelength range of the optical signal within all the amplifier stages, and, consequently, an overall low noise figure.

The different pump frequencies may be disposed in the first and in the second amplifier stage 10', 10" by preferably taking into account the attenuation versus wavelength of the Raman-active medium included in the Raman active fibers 11, 12. More particularly, in order to obtain a low noise figure, a first portion of optical signal having a greater attenuation in the Raman-active medium with respect to a second portion of optical signal should be preferably amplified first in the Raman amplifier. Accordingly, the pump frequencies suitable for amplifying such first portion of optical signal may preferably be arranged in the first amplifier stage, with respect to the traveling direction of the optical signal to be amplified. For example, with reference to FIG. 1 and considering a traveling direction of the optical signal to be amplified from left to right, the Raman amplifier 10 may comprise silica-based fibers or silica/germania-based fibers and may be adapted for amplifying signals ranging from 1530 nm to 1610 nm. For this purpose, the following four pump wavelengths may be used: 1425 nm ($v_p$=210.5 THz), 1440 nm ($v_2$=208.3 THz), 1470 nm ($v_p$=204.1 THz), 1510 nm ($v_p$=198.7 THz). A preferred arrangement for these four pump wavelengths may be disposing the first two wavelengths for pumping the first stage 10' and the second two wavelengths for pumping the second stage 10". With such arrangement, the first amplifier stage 10' provides a substantial amplification of a portion of optical signal having a wavelength comprised in a range between about 1530 nm and 1560 nm, while the second amplifier stage 10" provides a substantial amplification of a portion of optical signal having a wavelength comprised in a range between about 1560 nm and 1610 nm. As the attenuation of an optical signal having a wavelength comprised between 1530 nm and 1560 nm is higher with respect to the attenuation of an optical signal having a wavelength comprised between 1560 nm and 1610 nm in a silica-based or silica/germania-based optical fiber, it is convenient to dispose the shorter pumping wavelengths in the first amplifier stage 10' and the longer pump wavelengths in the second amplifier stage 10". In fact, the portion of optical signal having higher wavelengths may travel through the first amplifier stage 10' without suffering a too high attenuation, before being amplified in the second amplifier stage 10", keeping the noise figure of this portion of optical signal to an acceptable level. On the other hand, the portion of optical signal having lower wavelengths is amplified in the first amplifier stage 10', with no substantial degradation of its noise figure due to attenuation in the second amplifier stage 10".

The arrangement of the pump frequencies according to the invention may advantageously lead to a Raman amplifier having a low noise figure and a flat, broad band Raman gain by using pump lasers having substantially the same pump power emission, i.e. having an overall variation of at most the 50%, preferably the 40%, more preferably the 30% of the average pump power emission of the pump lasers used in the Raman amplifier. In fact, as a transfer of energy is reduced or practically avoided between the different pumping radiations, there is no need to use different powers for different pump wavelengths in order to reach a flat Raman gain versus wavelength. The use of pump lasers having substantially the same pump power emission is of particular importance with reference to different aspects related to the design and to the functioning of the Raman amplifier, such as for example the reliability of the pump lasers (pump lasers having the same reliability can be used), the durability of the pump lasers (pump lasers will, on average, work fine for almost the same time), the cooling of the pump lasers (the same type of cooling apparatus can be used for all the pump lasers), the manufacturing technology of the pump lasers (all the pump lasers may be of the same kind).

The Raman amplifier according to the invention may be part of a WDM transmission system, comprising a transmitting station, a receiving station and an optical line connecting said transmitting station and said receiving station. The transmitting station comprises a plurality of transmitters adapted to emit a respective plurality of optical channels, each having a respective wavelength. The plurality of optical channels are combined together in a WDM optical signal by a multiplexing device, to be inserted into a first end of the optical line. The receiving station comprises a plurality of receivers adapted to receive the WDM optical signal and discriminate the Information carried by each optical channel received. For this purpose, the receiving station typically comprises a demultiplexing device, connected to a second end of the optical line, adapted to separate the different optical channels included in the WDM optical signal. The optical line typically comprises at least one transmission optical fiber. At least one amplifier, comprising at least one Raman amplifier according to the invention, is provided along the optical line in order to counteract attenuation introduced on the optical signal by at least a portion of said transmission optical fiber or fibers. Other sources of attenuation can be connectors, couplers/splitters and various devices, such as for example modulators, switches, add-drop multiplexers and so on, disposed along the optical line, and/or in the transmitting station, and/or in the receiving station. The optical transmission system comprising at least one Raman amplifier according to the invention can be any kind of optical transmission system, such as for example a terrestrial transmission system or a submarine transmission system. The optical line may also comprise other types of amplifiers, such as for example erbium doped fiber amplifiers or semiconductor amplifiers, in combination with at least one Raman amplifier according to the invention. In particular, distributed Raman amplification may be used in combination with embodiments of lumped Raman amplifiers arranged according to the teachings of the present invention.

Figure 2:
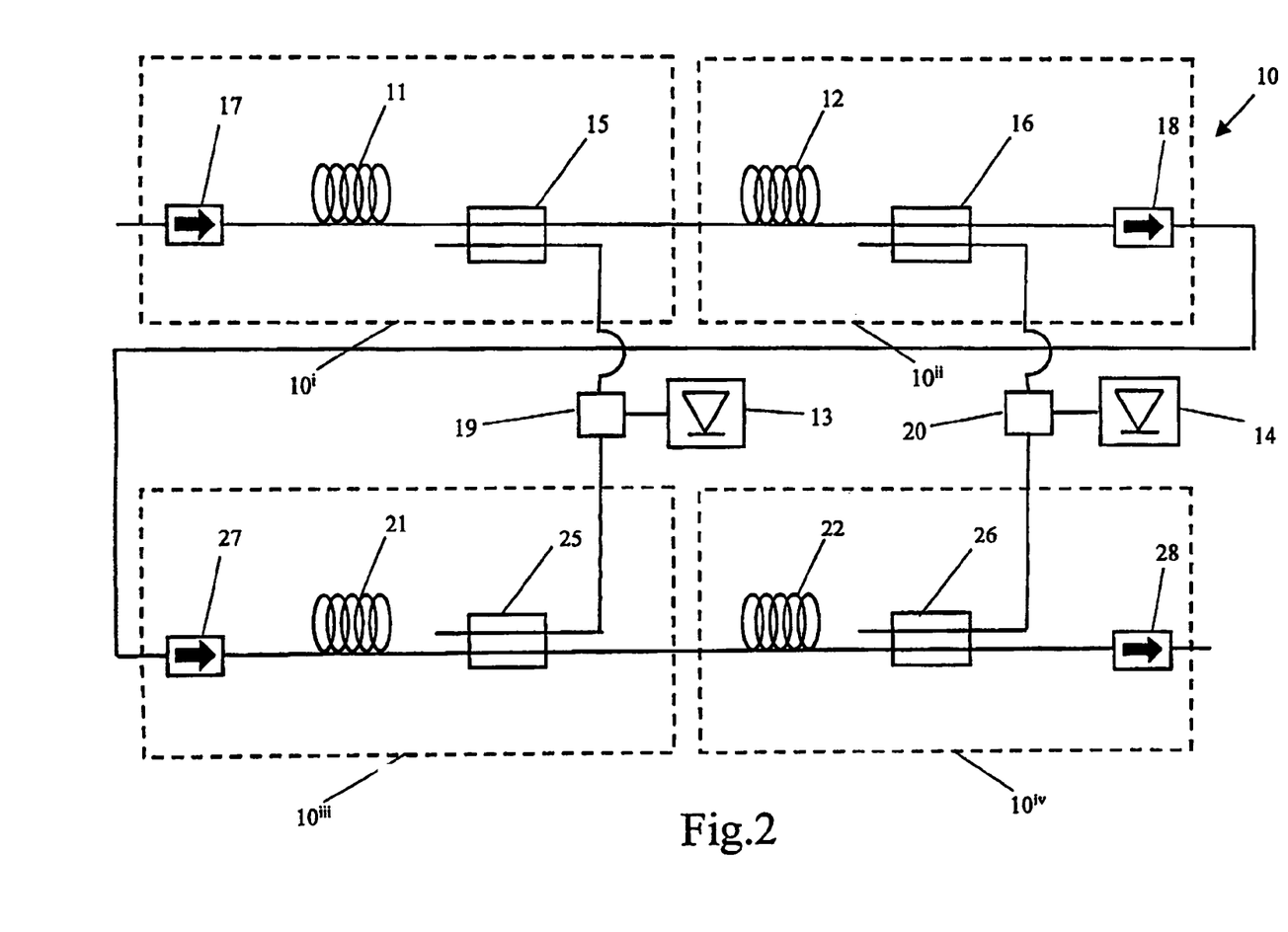
FIG. 2 schematically shows a second embodiment of a Raman amplifier according to the present invention.

In particular, FIG. 2 shows a preferred embodiment of a lumped Raman amplifier 10 according to the invention, comprising four stages $10^i$, $10^{ii}$, $10^{iii}$, $10^{iv}$. Each of the four amplifier stages comprises a Raman-active fiber (11, 12, 21, 22) and a WDM coupler (15, 16, 25, 26). The four amplifier stages may also comprise optical isolators (17, 18, 27, 28). A first pump source 13 is arranged so as to provide pump radiation to the Raman-active fibers 11, 21 of the first and of the third stage $10^i$, $10^{ii}$. For this purpose, a splitting device 19 may be used for dividing the radiation emitted by the pump source 13. A second pump source 14 is arranged so as to provide pump radiation to the Raman-active fibers 12, 22 of the second and of the fourth stage $10^{ii}$, $10^{iv}$. For this purpose, a splitting device 20 may be used for dividing the radiation emitted by the pump source 14. Any conventional splitting device 19, 20 may be used in the embodiment shown in FIG. 1, such as for example a fused fiber coupler or an integrated waveguide coupler. With regards to the features of the Raman-active fibers 11, 12, 21, 22, of the WDM couplers 15, 16, 25, 26 and of the pump sources 13, 14 reference is made to what disclosed above in connection with FIG. 1. In particular, a first group of pump frequencies is used in the first and in the third amplifier stage and a second group of pump frequencies is used in the second and in the fourth amplifier stage. The first and the second groups of pump frequencies have the features disclosed above in connection with FIG. 1.

The preferred embodiment of Raman amplifier shown in FIG. 1 or FIG. 2 may be advantageously used in metropolitan, long-haul or ultra long-haul optical systems in place of erbium doped fiber amplifiers, for amplifying WDM or DWDM optical signals included between 1460 nm and 1650 nm, typically between 1530 nm and 1610 nm. The amplifier of FIG. 1 or FIG. 2 may advantageously amplify an optical signal exploiting all the available wavelength band for the WDM optical signal. On the contrary, amplification based on erbium doped fiber amplifiers typically is performed using amplifier schemes in which different stages disposed in parallel with each other between a demultiplexing and a multiplexing device are used for amplifying different wavelength bands. This has the disadvantage that portions of bandwidth cannot be used for the optical signal, in order to correctly separate and route the different wavelength bands in the different parallel amplifier stages.

Typically, in a long-haul or ultra-long-haul system a compensation of the chromatic dispersion is performed at the amplifier sites. Further, an optical add-drop multiplexer may be disposed in order to extract and insert optical channels along the optical line, at the amplifier sites. A chromatic dispersion compensator and/or an optical add-drop multiplexer may be advantageously disposed between the second and the third amplifier stages in the preferred embodiment of Raman amplifier 10 shown in FIG. 2.

EXAMPLE 1

Comparison

Figure 3:
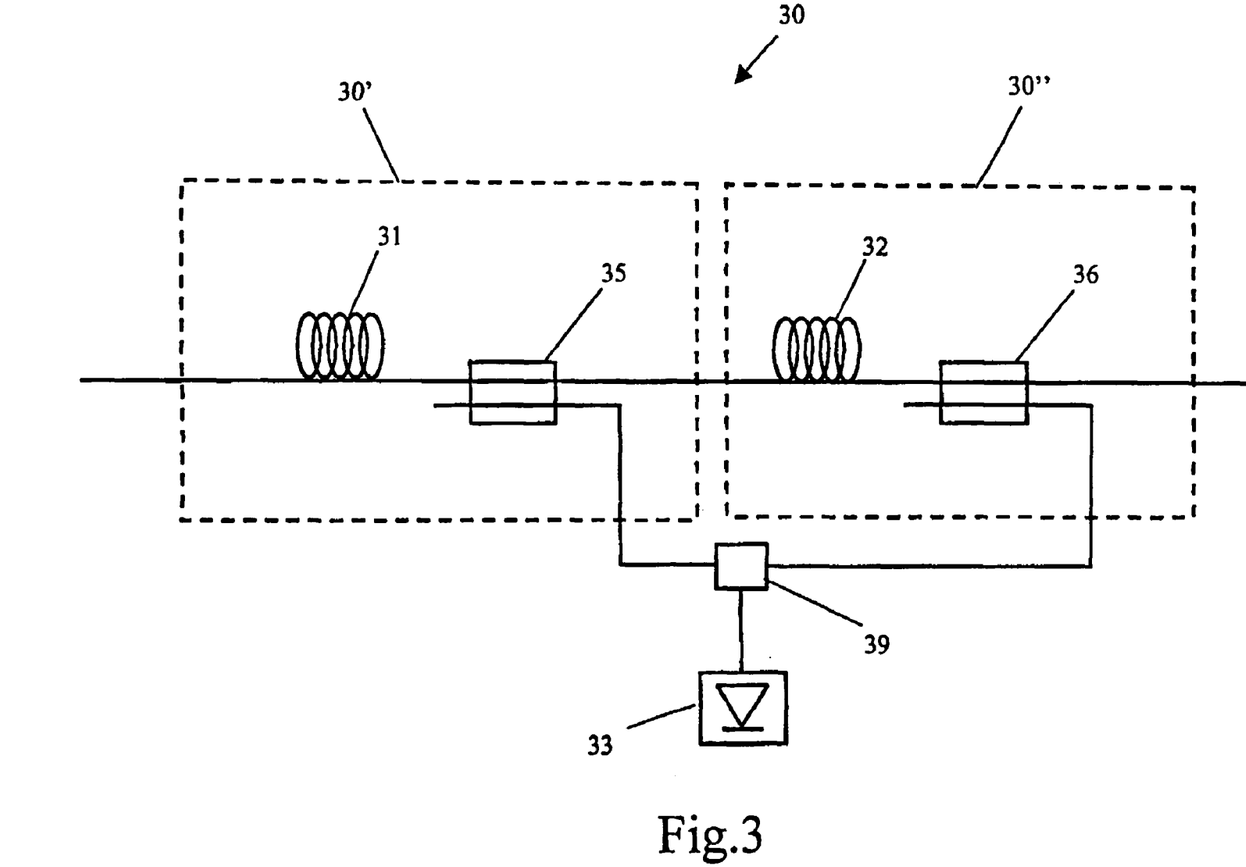
FIG. 3 shows an embodiment of a Raman amplifier according to the prior art, in which the same pump radiations are used in the first and in the second stage.

In a first simulation, the Applicant considered a double stage amplifier according to FIG. 3. Each of the first and second stage 30', 30" of the Raman amplifier included a length of 3500 m of a silica-germania Raman-active optical fiber (31, 32) having a $g_R/A_{eff}$ ratio of $6.5 \cdot 10^{-3}$ 1 (W·m), an attenuation of 0.4 dB/km at a signal wavelength between 1530 nm and 1610 nm and an attenuation of 0.6 dB/km at a pump wavelength range included between 1425 nm and 1510 nm. Four different pump wavelengths were used for pumping both Raman-active fibers 31, 32: $\lambda_1$=1425 nm ($v_1$=210.5 THz), $\lambda_2$=1440 nm ($v_2$=208.3 THz), $\lambda_3$=1470 nm ($v_3$=204.1 THz), $\lambda_4$=1510 nm ($v_4$=198.7 THz). More particularly, in the pump source 33 the pump power emission of four pairs of pump lasers (one pair per pump wavelength, each pair consisting of two lasers connected to a polarization beam combiner) were multiplexed together and sent, via the 60/40 splitter 39 and the WDM couplers 35, 36 to both Raman-active fibers 31, 32. More particularly, the 60% of the pump radiation was sent to the first stage and the 40% to the second stage. In each amplifier stage, the difference between the minimum and the maximum pump frequency was 11.8 THz (i.e., about 89% of the Raman shift).

The noise figure of a Raman amplifier arranged as above was calculated for two different configurations, being optimized for obtaining:

a) a gain of 10 dB, with an input signal power of −11 dBm per channel, (suitable for an ultra long-haul system using 200 channels with a channel spacing of 50 GHz);

b) a gain of 28 dB, with an input signal power of −28 dBm per channel, (suitable for a long-haul system using 200 channels with a channel spacing of 50 GHz).

In the following table 1 the pump power $P(\lambda)$ per each pump laser is reported for the two configurations a) and b) optimized for fulfilling the above performances.

TABLE 1

| Configuration | $P(\lambda_1)$ | $P(\lambda_2)$ | $P(\lambda_3)$ | $P(\lambda_4)$ |
|---|---|---|---|---|
| a) | 560 mW | 450 mW | 160 mW | 70 mW |
| b) | 760 mW | 620 mW | 180 mW | 30 mW |

A medium access loss of 6 dB between the first stage 30' and the second stage 30" was also considered, for example in case of accomplishment of a dispersion compensator. The obtained gain flatness between 1530 nm and 1610 nm was of ±0.5 dB for both configurations a) and b).

Figure 4:
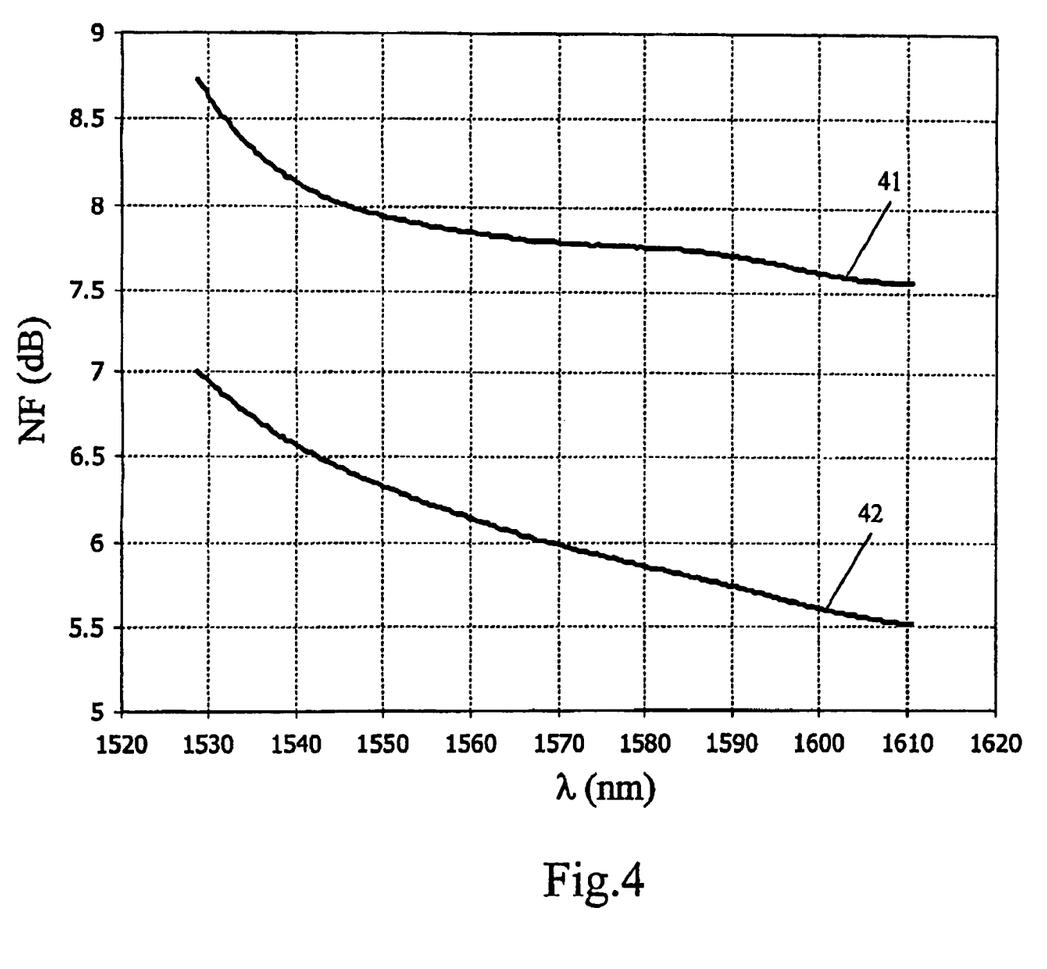
FIG. 4 shows the noise figure obtained with two configurations of Raman amplifier according to FIG. 3.

FIG. 4 shows the obtained noise figure versus wavelength between 1530 and 1610 nm for configurations a) (curve 41) and b) (curve 42). As it can be seen, a higher noise figure is obtained for shorter signal wavelengths with respect to longer signal wavelength in both cases, due to transfer of energy between shorter pump wavelengths and longer pump wavelengths. Due to this energy transfer, the pump radiation at shorter pump wavelengths must have high power, which is not used for amplification of the signal.

EXAMPLE 2

Invention

In a second simulation, the Applicant considered a configuration of Raman amplifier according to FIG. 2. The same pump wavelengths disclosed with reference to example 1 were used, but this time the pump source 13 included only pump lasers having wavelengths $\lambda_1$, $\lambda_2$ and the pump source 14 included only pump lasers having wavelengths $\lambda_3$, $\lambda_4$ (one pair of lasers per wavelengths, combined together via a polarization beam combiner). The features of the Raman-active fibers used in the four stages of the amplifier were also the same as in example 1. The splitter 19 was a 60/40 splitter, the splitter 20 was a 65/35 splitter. More particularly, the higher pump power was sent to the first and third amplifier stages. Thus, in the first and in the third amplifier stages the difference between the minimum and the maximum pump frequency was 1 THz (i.e. about 7.5% of the Raman shift), whereas in the second and in the fourth amplifier stages the difference between the minimum and the maximum pump frequency was 5.4 THz (i.e. about 41% of the Raman shift).

For fulfilling the conditions required in case a) of example 1 (ultra long-haul system) the first Raman-active fiber 11 was 1500 m long, the second Raman-active fiber 12 was 1400 m long, the third Raman-active fiber 21 was 1800 m long and the fourth Raman-active fiber 22 was 2000 m long. All the pump lasers had a power emission of 400 mW.

For fulfilling the conditions required in case b) of example 1 (long-haul system) the first Raman-active fiber 11 was 2000 m long, the second Raman-active fiber 12 was 2000 m long, the third Raman-active fiber 21 was 3000 m long and the fourth Raman-active fiber 22 was 3000 m long. All the pump lasers had a power emission of 415 mW.

A medium access loss of 6 dB was also considered in both cases, between the second and third stage, for example in case of accomplishment of a dispersion compensator. The obtained gain flatness between 1530 nm and 1610 nm was of ±0.5 dB in both cases.

Figure 5:
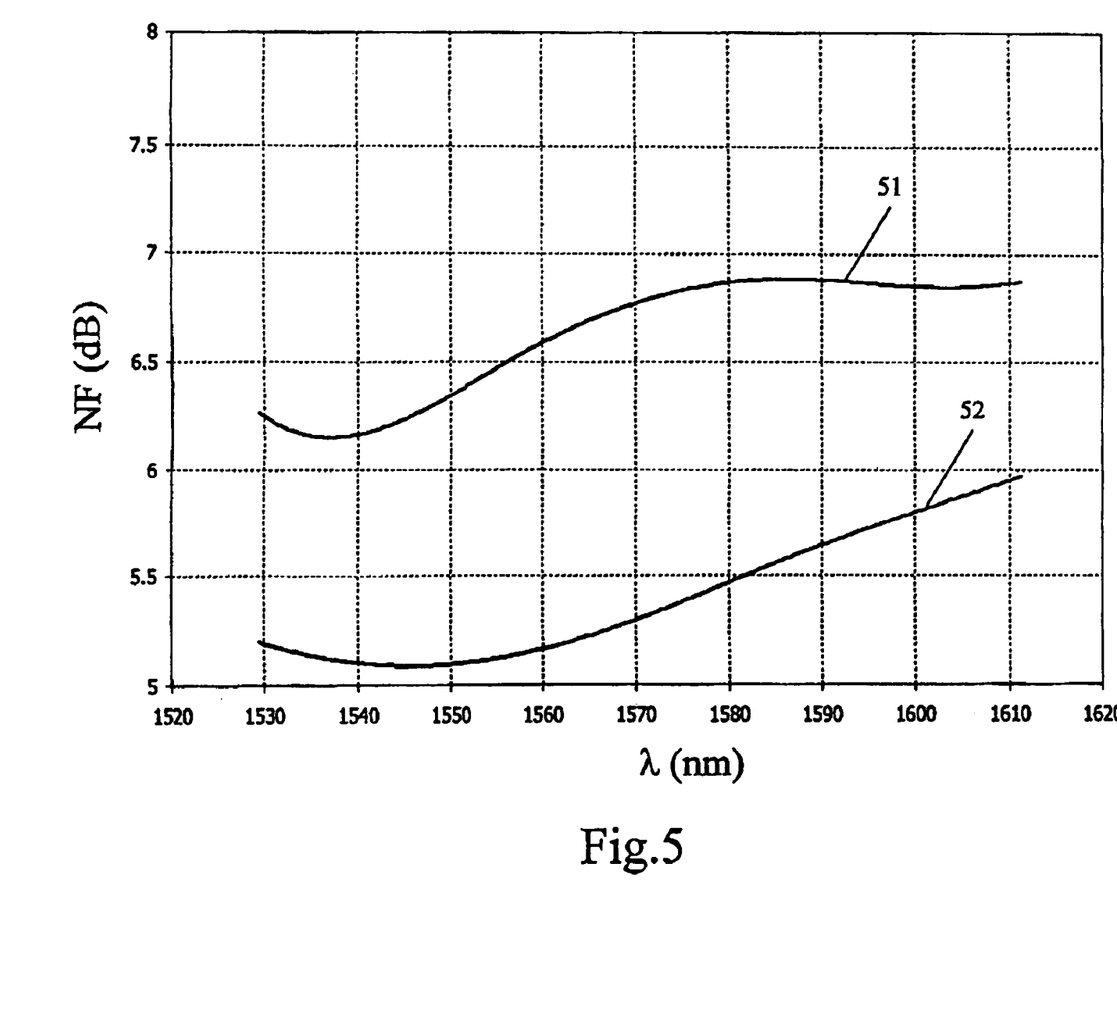
FIG. 5 shows the noise figure obtained with two configurations of Raman amplifier according to FIG. 2.

FIG. 5 shows the obtained noise figure versus wavelength between 1530 and 1610 nm for configurations a) (curve 51) and b) (curve 52). As it can be seen, a lower noise figure is obtained at shorter signal wavelengths with respect to the previous cases shown in FIG. 4, due to a substantial reduction of transfer of energy between shorter and longer pump wavelengths within each amplifier stage. More particularly, curve 51 in FIG. 5 is lower than the corresponding curve 41 in FIG. 4 over the whole wavelength range; on the other hand, curve 52 in FIG. 5 is lower than the corresponding curve 42 in FIG. 4 up to about 1590 nm. For longer signal wavelengths, a slightly higher noise figure is obtained with respect to the previous example in case b), due to the fact that the longer signal wavelengths are practically amplified only in the second and fourth stage of the amplifier, so that they suffer a higher Input loss in comparison with the shorter signal wavelengths. However, for configuration b) a maximum value of about 5.9 dB is obtained, with respect to about 7 dB in FIG. 4.

EXAMPLE 3

Invention

In a third simulation, the Applicant considered a further configuration of Raman amplifier according to FIG. 2. The same pump wavelengths disclosed with reference to example 1 were used, but this time the pump source 13 included pump lasers having wavelengths $\lambda_1$, $\lambda_2$, $\lambda_3$ and the pump source 14 included only pump lasers having wavelengths $\lambda_4$ (one pair of lasers per wavelengths, combined together via a polarization beam combiner). The features of the Raman-active fibers used in the four stages of the amplifier were also the same as in example 1. The splitter 19 was a 60/40 splitter, the splitter 20 was a 65/35 splitter. More particularly, the higher pump power was sent to the first and third amplifier stages. Thus, in the first and in the third amplifier stages the difference between the minimum and the maximum pump frequency was 6.4 THz (i.e., about 49% of the Raman shift).

For fulfilling the conditions required in case a) of example 1 (ultra long-haul system) the first Raman-active fiber 11 was 1800 m long, the second Raman-active fiber 12 was 2000 m long, the third Raman-active fiber 21 was 2000 m long and the fourth Raman-active fiber 22 was 2200 m long. For fulfilling the conditions required in case b) of example 1 (long-haul system) the first Raman-active fiber 11 was 2000 m long, the second Raman-active fiber 12 was 3000 m long, the third Raman-active fiber 21 was 2500 m long and the fourth Raman-active fiber 22 was 2500 m long.

In the following table 2 the pump power P($\lambda$) per each pump laser is reported for the two configurations a) and b) optimized for fulfilling the required performances.

TABLE 2

| Configuration | P($\lambda_1$) | P($\lambda_2$) | P($\lambda_3$) | P($\lambda_4$) |
|---|---|---|---|---|
| a) | 450 mW | 450 mW | 200 mW | 400 mW |
| b) | 600 mW | 550 mW | 150 mW | 500 mW |

A medium access loss of 6 dB was also considered in both cases, between the second and third stage, for example in case of accomplishment of a dispersion compensator. The obtained gain flatness between 1530 nm and 1610 nm was of ±0.5 dB in both cases.

Figure 6:
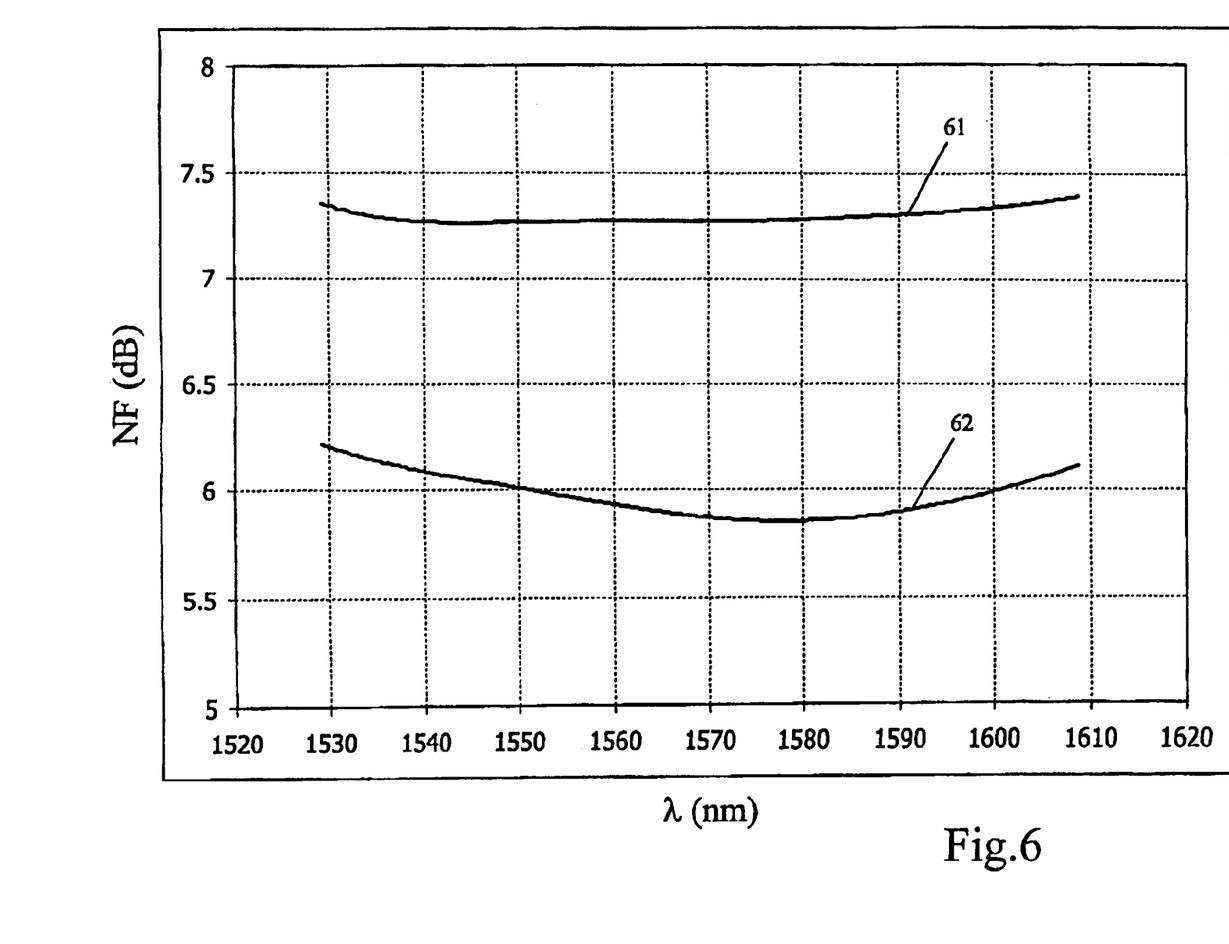
FIG. 6 shows the noise figure obtained with two further configurations of Raman amplifier according to FIG. 2.

FIG. 6 shows the obtained noise figure versus wavelength between 1530 and 1610 nm for configurations a) (curve 61) and b) (curve 62). As it can be seen, a substantially flat noise figure versus wavelength is obtained. More particularly, for case a) a maximum noise figure value of about 7.4 dB is obtained, with respect to about 8.7 dB in FIG. 4, whereas for configuration b) a maximum noise figure value of about 6.2 dB is obtained, with respect to about 7 dB in FIG. 4.

The invention claimed is:

1. A Raman amplifier adapted for amplifying an optical signal having frequency in a signal frequency range comprising at least a first and a second optical path disposed in series with each other, each comprising a Raman-active material having a predetermined Raman shift, said amplifier comprising:

a first pump source connected to said first optical path, said first pump source being adapted for emitting and coupling into said first optical path a first pump radiation including a first group of pump frequencies between a first minimum pump frequency and a first maximum pump frequency; and a second pump source connected to said second optical path, said second pump source being adapted for emitting and coupling into said second optical path a second pump radiation including a second group of pump frequencies between a second minimum pump frequency and a second maximum pump frequency, a whole of said first and second group of pump frequencies extending over a pump frequency range having a width of at least 40% of said Raman shift;

at least a portion of said first group of pump frequencies being excluded from said second group of pump frequencies and at least a portion of said second group of pump frequencies being excluded from said first group of pump frequencies;

the couplings between said first and second pump sources and said first and second optical paths being such that a residual of said second pump radiation coupled into said first optical path has a power lower by 10 dB than said first pump radiation, and such that a residual of said first pump radiation coupled into said second optical path has a power lower by 10 dB than said second pump radiation;

said first minimum pump frequency and said first maximum pump frequency differing from each other by at most 70% of said Raman shift; and said second minimum pump frequency and said second maximum pump frequency differing from each other by at most 70% of said Raman shift.

2. The Raman amplifier according to claim 1, wherein the couplings between said first and second pump sources and said first and second optical paths are such that a residual of said second pump radiation coupled into said first optical path has a power lower by 13 dB than said first pump radiation, and such that a residual of said first pump radiation coupled into said second optical path has a power lower by 13 dB than said second pump radiation.

3. The Raman amplifier according to claim 1, wherein said first minimum pump frequency and said first maximum pump frequency differ from each other by at most 50% of said Raman shift, and said second minimum pump frequency and said second maximum pump frequency differ from each other by at most 50% of said Raman shift.

4. The Raman amplifier according to claim 1, wherein said pump frequency range has a width of at least 50% of said Raman shift.

5. The Raman amplifier according to claim 1, wherein said first and second group of pump frequencies do not overlap each other.

6. The Raman amplifier according to claim 1, wherein said first minimum and said first maximum pump frequencies define a first pump frequency range and said second minimum and said second maximum pump frequencies define a second pump frequency range, at least one of said first and second pump frequency ranges having a width of at least 20% of said Raman shift.

7. The Raman amplifier according to claim 1, wherein said first group of pump frequencies is adapted for Raman amplifying a first portion of said optical signal, said second group of pump frequencies is adapted for Raman amplifying a second portion of said optical signal, the first portion of optical signal having a greater attenuation versus wavelength in said Raman-active material than the second portion of optical signal.

8. The Raman amplifier according to claim 1, wherein said first and said second pump sources comprise a plurality of pump lasers, said plurality of pump lasers having an overall variation of pump power emission of at most 50% of an average pump power emission.

9. An optical system comprising at least one optical line, said optical line including at least one optical fiber and at least one Raman amplifier connected to said optical fiber, said Raman amplifier adapted for amplifying an optical signal having frequency in a signal frequency range comprising at least a first and a second optical paths disposed in series with each other, each comprising a Raman-active material having a predetermined Raman shift, said amplifier comprising:

a first pump source connected to said first optical path, said first pump source being adapted for emitting and coupling into said first optical path a first pump radiation including a first group of pump frequencies between a first minimum pump frequency and a first maximum pump frequency; and a second pump source connected to said second optical path, said second pump source being adapted for emitting and coupling into said second optical path a second pump radiation including a second group of pump frequencies between a second minimum pump frequency and a second maximum pump frequency, a whole of said first and second group of pump frequencies extending over a pump frequency range having a width of at least 40% of said Raman shift;

at least a portion of said first group of pump frequencies being excluded from said second group of pump frequencies and at least a portion of said second group of pump frequencies being excluded from said first group of pump frequencies;

the couplings between said first and second pump sources and said first and second optical paths being such that a residual of said second pump radiation coupled into said first optical path has a power lower by 10 dB than said first pump radiation, and such that a residual of said first pump radiation coupled into said second optical path has a power lower by 10 dB than said second pump radiation;

said first minimum pump frequency and said first maximum pump frequency differing from each other by at most 70% of said Raman shift; and said second minimum pump frequency and said second maximum pump frequency differing from each other by at most 70% of said Raman shift.

10. An optical system according to claim 9, further comprising a transmitting station including a plurality of transmitters adapted for emitting a respective plurality of optical channels, each having a respective wavelength, said transmitting station being connected to a first end of said optical line.

11. An optical system according to claim 10, further comprising a receiving station including a plurality of receivers adapted to discriminate information carried by said optical channels, said receiving station being connected to a second end of said optical line.

* * * * *